A. MEHLFELDER.
MOTION PICTURE MACHINE.
APPLICATION FILED MAY 26, 1913.
1,258,352.
Patented Mar. 5, 1918.
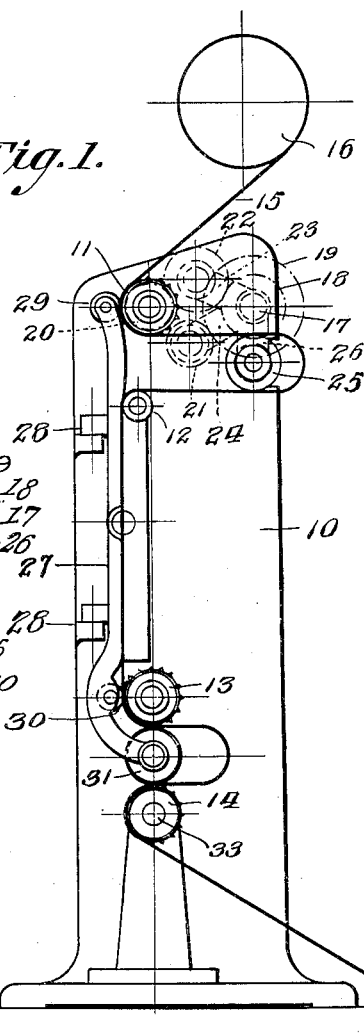
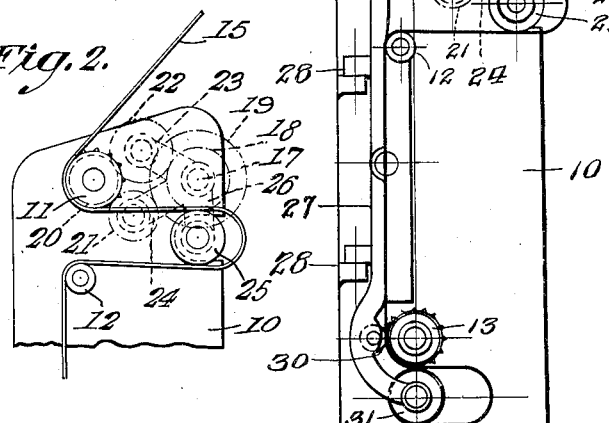
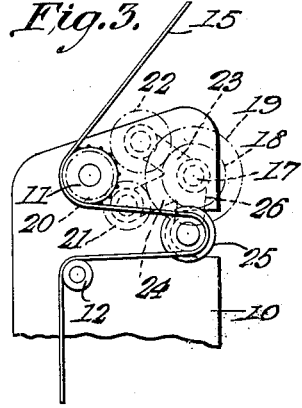
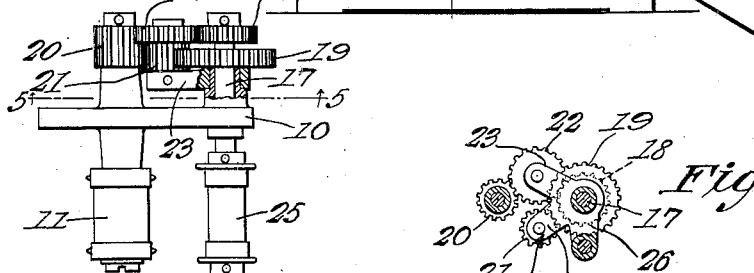
WITNESSES:
INVENTOR
Anton Mehlfelder.
BY
ATTORNEY

UNITED STATES PATENT OFFICE.

ANTON MEHLFELDER, OF NEW YORK, N. Y.

MOTION-PICTURE MACHINE.

1,258,352.  Specification of Letters Patent.  Patented Mar. 5, 1918.

Application filed May 26, 1913. Serial No. 770,044.

*To all whom it may concern:*

Be it known that I, ANTON MEHLFELDER, citizen of Germany, and resident of New York, in the county of New York and State of New York, have invented certain new and useful Improvements in Motion-Picture Machines, of which the following is a specification.

This invention relates to motion picture machines and has in view the provision of means for uniformly maintaining loops of sufficient length in a film as it passes through the machine.

Further objects will be apparent from the following specification, appended claims and drawings, in which, Figure 1 is a diagrammatic view of portions of a moving picture machine showing the elements of this invention applied thereto, Fig. 2 is a view showing the regulation of the upper loop, Fig. 3 is a similar view with the parts moved to another position, Fig. 4 is a plan of the elements shown in Fig. 2, Fig. 5 is a view in side elevation of the gear arrangement shown in Fig. 4, and is a sectional view taken on the line 5—5, Fig. 4 and looking in the direction of the arrows.

Referring to the drawings, there is shown a frame 10 which supports the projecting machine. This frame supports sprocket wheels 11, 13, and 14, and the idly rotatable roller 12 on their shafts, and a film 15 passes over these sprockets and roller as will be described.

The sprocket wheel 11 is driven in one direction continuously but at variable speeds as will be shown and from this sprocket wheel, an upper loop is formed in the film before it passes through the machine. From this upper loop, the film is fed intermittently through the machine across the light and is exhibited, after passing over a roller 12. The film then passes partly around the intermittently driven sprocket wheel 13 where another loop is formed, and from the lower loop, the film passes partly around the sprocket wheel 14 from where it is wound upon a lower reel. The film to be exhibited is unrolled from a reel 16.

A shaft 17 is mounted in bearings formed in the frame and this shaft is driven continuously at a desired speed. This shaft has gears 18 and 19 secured thereto to impart motion to a gear 20 secured to the shaft of the sprocket wheel 11, through idlers 21 or 22. The gears 18 and 19 have different diameters and therefore have different circumferential velocity and the idlers 21 and 22 are of different diameters to compensate for this difference. These idlers are mounted in such a manner as to permit only one or the other to mesh with the gear 20, and as the idlers are driven at different speeds, it is apparent that the speed of the gear 20 may be varied. The idlers 21 and 22 are mounted upon arms 23 and 24 respectively and these arms extend from a sleeve which is pivotally mounted upon the bearing for the shaft 17. A pulley 25 is mounted upon a shaft carried by an arm 26 which is also formed integral with the arms 23 and 24 and it is by this arm that the arms 23 and 24 are moved so as to cause the engagement of one or the other of the idlers 21 and 22.

When the upper loop is sufficiently large to permit safe operation of the machine without injuring the film, the pulley 25 is swung from the sprocket 11 and thereby reduces the speed of this sprocket, but when the loop becomes reduced in size, the bight formed by the film engages this pulley when it swings the arms 23, 24 and 26 and then changes the arrangement of the idlers 21 and 22 to cause the speed of the gear 20 to be increased.

The frame 10 has a door 27 hinged thereto as at 28, and this door carries a roller 29 which engages the film as it partly surrounds the sprocket wheel 11 and holds it thereon, also a lower roller 30 which similarly engages the film to hold it upon the intermittently driven sprocket wheel 13, and a roller 31 which is disposed between the sprocket wheels 13 and 14.

The operation of the several parts of this invention has been explained in the foregoing, sufficiently to be understood. Numerous modifications of the elements shown, may be made without departing from the spirit of the invention.

What I claim as new is:

1. In a motion picture machine means for feeding film to the machine, and for forming a loop of the film, and a means controlled by the loop for controlling the speed of travel of the film.

2. In a motion picture machine, and in combination with the motion picture film a sprocket wheel for feeding film to said machine, a yieldably mounted member controlled by said film, and connections between said yieldably mounted member, and said sprocket wheel, for controlling the speed of rotation of said sprocket wheel.

3. In a motion picture machine, a continuously driven sprocket wheel for feeding the film into a loop before being exhibited, a pulley disposed in said loop, and means operable by said pulley for varying the speed of said sprocket wheel.

4. In a motion picture machine, a continuously driven sprocket wheel for feeding the film into a loop before being exhibited, a pulley disposed in said loop, said pulley having a yieldable mounting, and said pulley varying the speed of said sprocket wheel in its movement.

5. In a motion picture machine, a continuously driven sprocket wheel, a film passing partly around said sprocket wheel, a pulley mounted in contact with said film, a gear for driving said sprocket wheel, a driving gear for said first mentioned gear, idlers between said gears, and means operable by the pressure of said film on said pulley for varying the relation of said gears.

6. The combination with a continuously rotating sprocket wheel and an idler of a film passing over said wheel and said idler, to form a loop therebetween, and means interposed in said loop and controlled by the size thereof for controlling the speed of rotation of said sprocket wheel.

7. In a motion picture machine, sprocket wheels for imparting intermittent and continuous movements to a film, means for retarding the movement of the continuously moving sprocket wheel and means for automatically restoring the normal movement of said sprocket wheel.

8. In a motion picture machine, a compensating sprocket wheel for feeding the film into a loop before being exhibited, a pulley disposed in said loop and means operable by said pulley and controlled by the film for varying the speed of said sprocket wheel.

9. In a motion picture machine a continuously driven shaft, a sprocket mounted thereon, to feed a film, movably mounted transmission gears controlled by the film provided between said sprocket and its regular driving mechanism to impart a plurality of speeds to said sprocket automatically when the action of the film has become irregular.

Signed at New York in the county of New York and State of N. Y. this 19th day of May, A. D. 1913.

ANTON MEHLFELDER.

Witnesses:
C. A. O. ROSELL,
L. D. MORGAN.